R. W. FUNK.
TEMPORARY LOCKING PIECE FOR TRANSVERSELY SPLIT VEHICLE WHEEL RIMS.
APPLICATION FILED MAY 31, 1912.
1,041,062.  
Patented Oct. 15, 1912.
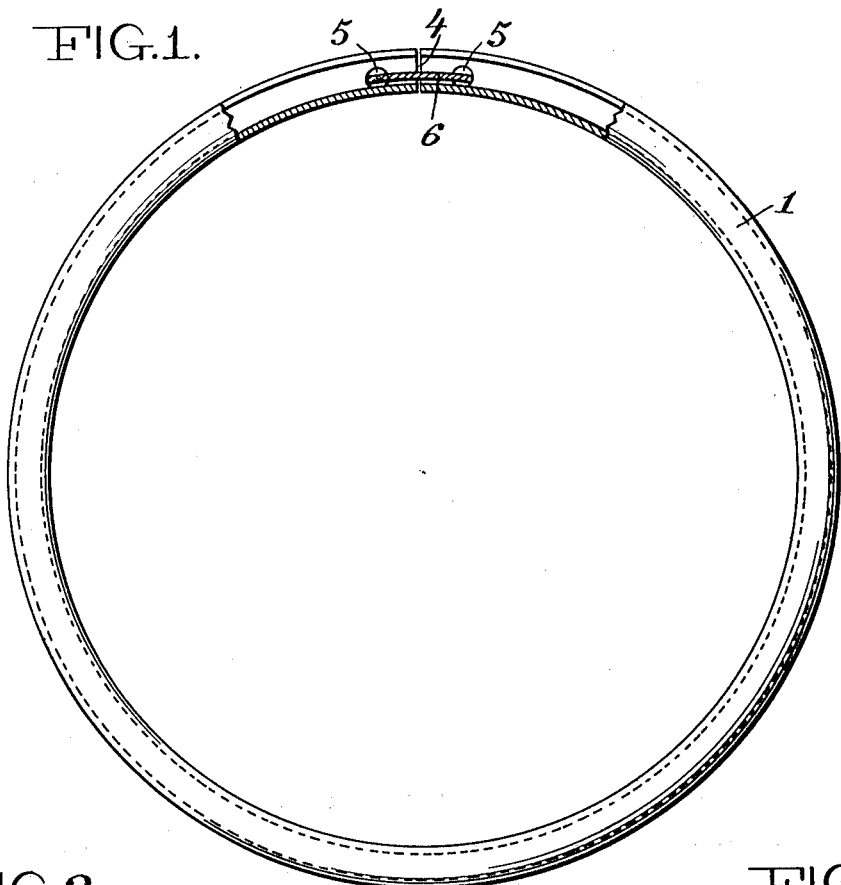
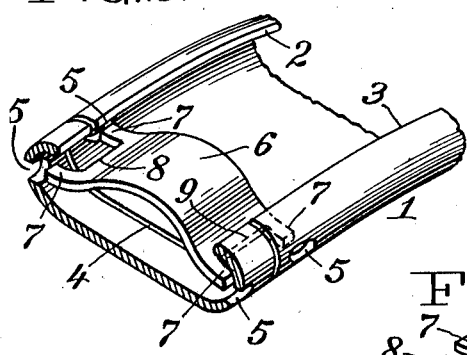
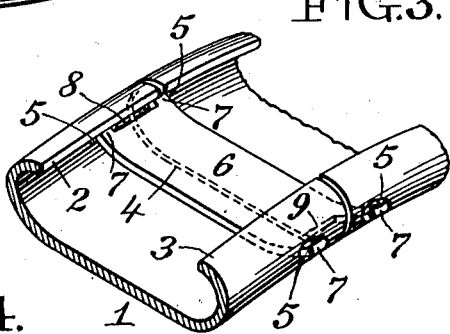
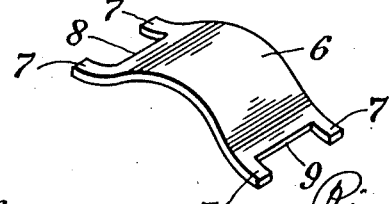

UNITED STATES PATENT OFFICE.

RICHARD W. FUNK, OF WEEHAWKEN, NEW JERSEY.

TEMPORARY LOCKING-PIECE FOR TRANSVERSELY-SPLIT VEHICLE-WHEEL RIMS.

1,041,062. Specification of Letters Patent. Patented Oct. 15, 1912.

Application filed May 31, 1912. Serial No. 700,901.

*To all whom it may concern:*

Be it known that I, RICHARD W. FUNK, a citizen of the United States, residing in the city of Weehawken, county of Hudson, and State of New Jersey, have invented certain new and useful Improvements in Temporary Locking-Pieces for Transversely-Split Vehicle-Wheel Rims, of which the following is a specification.

This invention relates to locking pieces or clips for securing together the ends of transversely split rims such as are widely used for carrying the tires of automobiles while these rims are being shipped, or at any other time prior to their actual use upon the wheel of a vehicle.

Tire-carrying rims which are separable from the wheel structure and which are transversely split for the purpose of promoting the ready attachment or detachment of the tire therefrom are in wide use in automobile service. When the rim is mounted upon the wheel it is firmly held by appropriate devices, so that the ends adjoining the split are alined and brought into juxtaposition, but when the rims are being handled before such use there is much danger of bending and permanent distortion of the rim resulting therefrom.

The purpose of my invention is to provide a simple positive means for locking the ends of the rim adjacent to the split in alined position without the use of any of the parts that normally come into service only when the rim is mounted upon the wheel.

In the accompanying drawings which form a part of this specification, Figure 1 is a side elevation of a vehicle wheel rim, a portion being broken away and sectioned to show my improved locking piece or clip in place; Fig. 2 is a fragmentary perspective showing the locking piece in position to be forced into place; Fig. 3 is a similar view showing the locking piece in final position; and Fig. 4 is a perspective view of the locking piece prior to its attachment to a rim.

Referring in detail to the drawings, the numeral 1 designates a vehicle wheel rim which may be of the clencher type as shown, having the clenches 2 and 3 and being transversely split at 4. At either side of the split in the rim holes 5 are provided for the reception of the means which normally lock the rim when in operative position upon the wheel. My improved locking piece consists of a body portion 6 having outstanding therefrom lugs 7 adapted to enter the holes 5 when the ends of the rim are brought into alinement and juxtaposition. The locking piece is preferably stamped from sheet metal and originally is formed convex as shown in Fig. 4, the distance between the ends of the lugs being equal to the distance between the inner surfaces of the clenches of the rim.

In applying the locking piece or clip to the rim, the ends of the rim are first brought together and the locking piece placed in the position shown in Fig. 2, so that its lugs aline with the corresponding holes through the clenches of the rim. By applying pressure to the top of the locking piece or clip, it will be forced into the position shown in Fig. 3, and the increase in length thus obtained will cause the lugs to enter the holes in the clenches of the rim and thus lock the ends together. Lateral movement of the ends one upon the other is prevented by the faces 8 and 9 of the locking piece or clip, each of which engages the inner surface of one of the clenches, while the lugs effectually prevent the separation of the ends of the rim in a longitudinal direction.

While it is possible to make the locking piece of any metal which is at all yieldable, I preferably construct it from substantially non-elastic stock, so that there will be little or no tendency for it to spring out of place. It will be seen, however, that the locking piece may be made of spring metal normally having the configuration shown in Fig. 3 and temporarily bent into the form shown in Fig. 2 while being sprung into place. The fact that the holes in the clenches of the rim are above the upper surface of the base of the rim permits the locking piece to be forced slightly past the plane of the axes of these holes and to exert a wedging effect which will add to the security of the combination.

It will be obvious that any suitable means of engagement between the locking piece and the rim may be used, and I do not desire to be limited to the precise construction illustrated and described.

When it is desired to use the rim, the insertion of a screwdriver or other tool beneath the locking piece or clip will readily force it out of place and permit the attachment of the rim to the wheel in the usual manner.

Having thus described my invention, I claim:

1. A temporary locking piece for transversely split vehicle wheel rims comprising a member adapted to span the split in a rim, and having projections thereon for engagement with said rim at either side of the split therein to hold the same in alined juxtaposition, said locking piece lying substantially within the boundaries of the rim when in operative position.

2. A temporary locking piece for transversely split vehicle wheel rims comprising a forked member having projections adapted to interlock with suitable means on either side of the split in a rim and thereby hold the adjacent ends of the same in alined juxtaposition.

3. A temporary locking piece for transversely split vehicle wheel rims comprising a member having two pairs of oppositely disposed projections adapted to interlock with suitable means on either side of the split in a rim and thereby hold the adjacent ends of the rim in alined juxtaposition.

4. A temporary locking piece for transversely split vehicle wheel rims comprising a member having two pairs of oppositely disposed outstanding lugs, each pair of which is adapted to span the split in a rim and to engage the rim on either side of the split to hold the ends thereof in alined juxtaposition.

5. A temporary locking piece for transversely split vehicle wheel rims comprising a sheet metal member having two pairs of oppositely disposed outstanding lugs, each pair being adapted to span the split in a rim and to engage the rim on either side of the split to hold the ends thereof in alined juxtaposition, the body of said member being bent or bowed to decrease its effective length prior to attachment to a rim.

RICHARD W. FUNK.

Witnesses:
 EDMUND QUINCY MOSES,
 GERALD E. TERWILLIGER.